US008230564B1

(12) United States Patent
Reid, Jr.

(10) Patent No.: US 8,230,564 B1
(45) Date of Patent: Jul. 31, 2012

(54) METHOD OF MAKING A MILLIMETER WAVE TRANSMISSION LINE FILTER

(75) Inventor: J. Robert Reid, Jr., Billerica, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 384 days.

(21) Appl. No.: 12/696,161

(22) Filed: Jan. 29, 2010

(51) Int. Cl.
*H01G 7/00* (2006.01)

(52) U.S. Cl. ....... 29/25.42; 29/592.1; 29/594; 29/609.1; 361/302; 361/303; 361/306.1; 361/309; 174/256; 174/257; 174/259

(58) Field of Classification Search ................. 29/25.42, 29/592.1, 594, 609.1; 174/256, 257, 259; 361/302, 303, 306.1, 309
See application file for complete search history.

(56) References Cited

U.S. PATENT DOCUMENTS 4,100,504 A 7/1978 McGann
4,268,809 A 5/1981 Makimoto et al.
4,477,786 A 10/1984 Tamura et al.
4,489,293 A 12/1984 Fiedziuszko
4,502,029 A 2/1985 Reed
4,568,895 A 2/1986 Reed
4,714,906 A 12/1987 D'Albaret et al.
4,721,932 A 1/1988 West
4,800,347 A 1/1989 Yorita et al.
4,800,348 A 1/1989 Rosar et al.
4,835,499 A 5/1989 Pickett
5,055,808 A 10/1991 Walker et al.
5,065,120 A 11/1991 Munn
5,115,373 A 5/1992 Takeda
5,191,305 A 3/1993 Frost et al.
5,417,408 A 5/1995 Ueda
5,418,509 A 5/1995 Piirainen
5,546,806 A 8/1996 Kain
5,821,836 A 10/1998 Katehi et al.
5,825,608 A * 10/1998 Duva et al. .................... 361/302
5,871,513 A * 2/1999 Taylor et al. .................... 607/36
6,008,980 A * 12/1999 Stevenson et al. ............ 361/302
6,801,104 B2 10/2004 Zhu et al.
6,977,566 B2 12/2005 Fukunaga
7,259,640 B2 8/2007 Brown et al.
7,283,347 B2 10/2007 Reid, Jr.
7,310,030 B2 12/2007 Tsai et al.
7,368,311 B2 5/2008 Tilmans et al.
7,378,655 B2 5/2008 Tai et al.
7,405,638 B2 7/2008 Sherrer et al.
(Continued)

OTHER PUBLICATIONS

E. Marsh et al., "Gold-Plated Micromachined Millimeter-Wave Resonators Based on Rectangular Coaxial Transmission Lines", IEEE Transactions on Microwave Theory and Techniques, Jan. 2007, vol. 55, No. 1, pp. 78-84.

(Continued)

*Primary Examiner* — Paul D Kim
(74) *Attorney, Agent, or Firm* — AFMCLO/JAZ; Charles Figer

(57) ABSTRACT

A millimeter wave transmission line filter having a plurality of filter pole determining coupled cavities fabricated with a multiple lithographic layer micromachining process. The filter cavities are oriented perpendicular to an underlying substrate element in order to achieve micromachining, fabrication and accuracy advantages. Multiple filters can be used in a frequency multiplex arrangement as in a duplexer. Radio frequencies in the 15 to 300 gigahertz range are contemplated.

18 Claims, 7 Drawing Sheets

U.S. PATENT DOCUMENTS

| | | | |
|---|---|---|---|
| 7,411,204 | B2 | 8/2008 | Appleby et al. |
| 2008/0073600 | A1 | 3/2008 | Appleby et al. |
| 2008/0199656 | A1 | 8/2008 | Nichols et al. |
| 2008/0246558 | A1 | 10/2008 | Brown et al. |

OTHER PUBLICATIONS

J. Robert Reid et al., "Micromachined Rectangular-Coaxial Transmission Lines", IEEE Transactions on Microwave Theory and Techniques, Aug. 2006, vol. 54, No. 8, pp. 3433-3442.

C. Tsau et al., "Fabrication of Wafer-Level Thermocompression Bonds", Journal of Microelectromechanical Systems, Dec. 2002, vol. 11, No. 6, pp. 641-647.

I. Hunter et al., "Microwave Filters—Applications and Technology", IEEE Transactions on Microwave Theory and Techniques, Mar. 2002, vol. 50, No. 3, pp. 794-805.

R. Levy et al., "Design of Microwave Filters", IEEE Transactions on Microwave Theory and Techniques, Mar. 2002, vol. 50, No. 3, pp. 783-793.

R. Levy et al., "Transitional Combline/Evanescent-Mode Microwave Filters", Dec. 1997, vol. 45, No. 12, pp. 2094-2099.

Z. Popović et al., "An Enabling New 3D Architecture for Microwave Components and Systems", Microwave Journal, Feb. 2008, pp. 66-86.

P. Blondy et al., "Integrated Millimeter-Wave Silicon Micromachined Filters", 30th European Microwave Conference, Oct. 2000, pp. 1-4.

W.D. Yan et al., "Micromachined Millimeter-Wave Ridge Waveguide Filter with Embedded MEMS Tuning Elements", IEEE MTT-S International Microwave Symposium Digest, Jun. 2006, pp. 1290-1293.

J. Yoon et al., "3-D Lithography and Metal Surface Micromachining for RF and Microwave MEMS", 15th IEEE International Conference on Micro Electro Mechanical Systems, 2002, pp. 673-676.

A. Cohen et al., "EFAB: Rapid, Low-Cost Desktop Micromachining of H igh Aspect Ratioture 3-D MEMS", 12th IEEE International Conference on Micro Electro Mechanical Systems, Jan. 1999, pp. 244-251.

R.T. Chen et al, "A Compact Low-Loss Ka-Band Filter Using 3-Dimensional Micromachined Integrated Coax", 17th IEEE International Conference on Micro Electro Mechanical Systems, 2004, pp. 801-804.

J.R. Reid et al., "A 55 GHz Bandpass Filter Realized with Integrated TEM Transmission Lines", IEEE MTT-S International Microwave Symposium Digest, Jun. 2006, pp. 132-135.

J.R. Reid et al, "A Compact Integrated Coaxial V-Band Bandpass Filter", IEEE Antennas and Propagation Society International Symposium, Jun. 2004, vol. 1, pp. 990-993.

J.R. Reid et al, "4-State Digital Variable Capacitors", Eurosensors XVIII, Sep. 2004, pp. 405-406.

* cited by examiner

| Layer | Thickness | Cummulative Height | Distance from the top | Mask |
|---|---|---|---|---|
| 25 | 25 | 610 | 0 | 10 |
| 24 | 25 | 585 | 25 | 9 |
| 23 | 25 | 560 | 50 | 7 |
| 22 | 25 | 535 | 75 | 8 |
| 21 | 25 | 510 | 100 | 7 |
| 20 | 25 | 485 | 125 | 8 |
| 19 | 10 | 460 | 150 | 7 |
| 18 | 25 | 450 | 160 | 8 |
| 17 | 25 | 425 | 185 | 7 |
| 16 | 25 | 400 | 210 | 8 |
| 15 | 25 | 375 | 235 | 7 |
| 14 | 25 | 350 | 260 | 8 |
| 13 | 25 | 325 | 285 | 7 |
| 12 | 25 | 300 | 310 | 8 |
| 11 | 25 | 275 | 335 | 7 |
| 10 | 25 | 250 | 360 | 8 |
| 9 | 25 | 225 | 385 | 7 |
| 8 | 25 | 200 | 410 | 8 |
| 7 | 25 | 175 | 435 | 7 |
| 6 | 25 | 150 | 460 | 6 |
| 5 | 25 | 125 | 485 | 5 |
| 4 | 25 | 100 | 510 | 4 |
| 3 | 25 | 75 | 535 | 3 |
| 2 | 25 | 50 | 560 | 2 |
| 1 | 25 | 25 | 585 | 1 |
| Substrate | | | | |

| | |
|---|---|
| (unshaded) | Unique Layers |
| (shaded) | Repeating Layer |

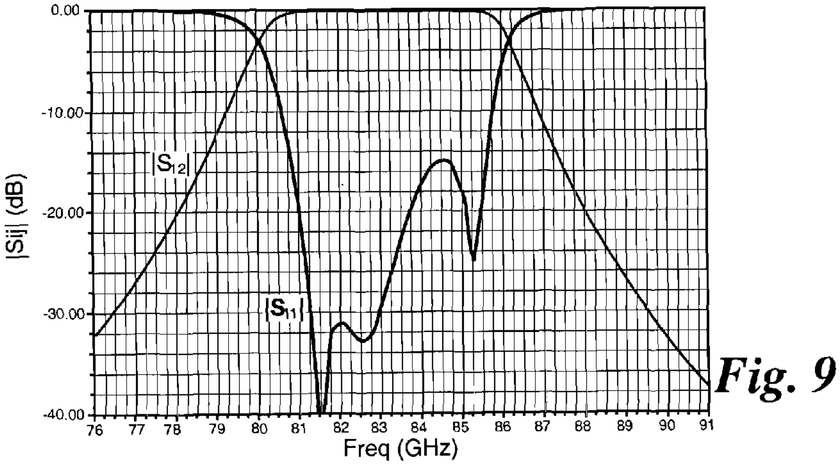
Fig. 9
Fig. 10
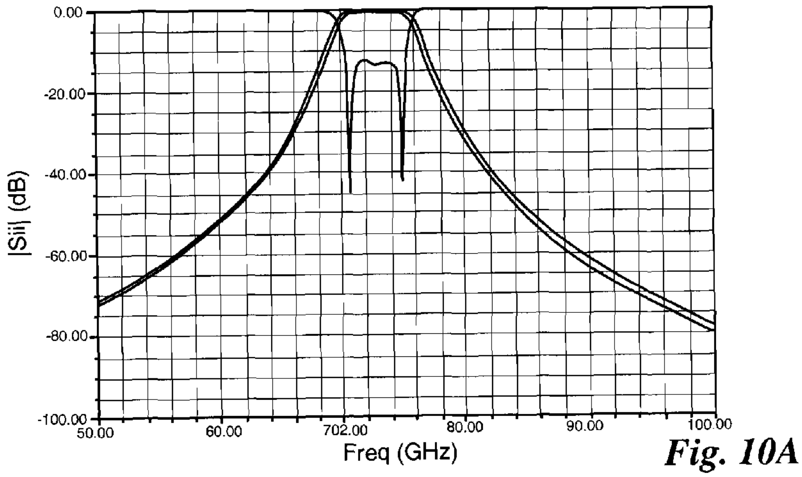
Fig. 10A
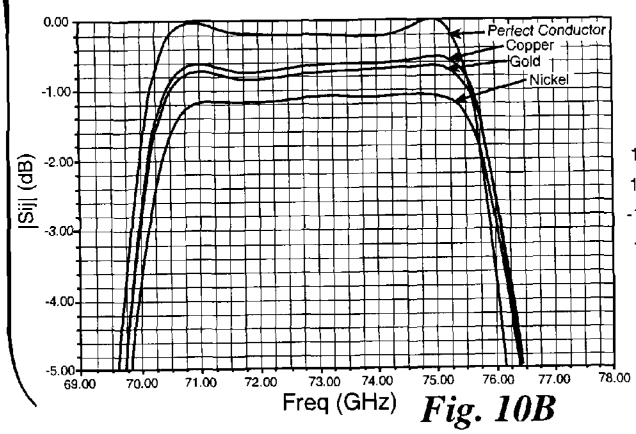
Fig. 10B
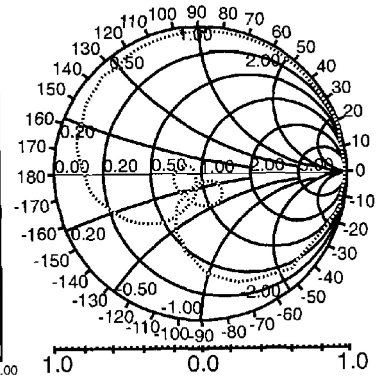
Fig. 10C

METHOD OF MAKING A MILLIMETER WAVE TRANSMISSION LINE FILTER

RIGHTS OF THE GOVERNMENT

The invention described herein may be manufactured and used by or for the Government of the United States for all governmental purposes without the payment of any royalty.

BACKGROUND OF THE INVENTION

Millimeter wave signal filters can be useful in the wireless communication art, in both the portable telephone and in location transmitting and receiving equipment. These filters can be used, in a single antenna system, to separate signals into incoming and outgoing directional components having slightly different frequencies, i.e., signals in dual filter frequency duplexer relationship. One type of filter is identified as a transitional evanescent mode/comb-line filter, a filter having a plurality of coupled resonators. The transitional evanescent mode/comb-line filter is used to achieve a sharply tuned response and signal separation desired, for example, in the recited communication service.

In some uses, these millimeter wave signal filters are formed by machining one or two pieces of aluminum and then silver plating the machined surfaces. End loading may be tuned through use of adjustable screws. It is believed that these types of filters have not been used as electronically tunable filters due to the lack of an acceptable high-Q tuning element. These machined filters are also generally limited to frequencies at the X-Band (8-12 GHz) and below due to fabrication tolerances achievable in a machining process.

Other filters have been implemented using micromachining processes. These filters are believed to have all been either enclosed stripline filters or loaded cavity resonators.

SUMMARY OF THE INVENTION

In one embodiment of the present invention there is provided an improved millimeter wave radio frequency comb signal filter apparatus.

The present invention can include a multiple poled millimeter wave filter embodied as a frequency multiplexing device.

In accordance with one aspect, there is provided a multiple cavity millimeter wave electrical filter resulting from a lithographic micromachining realization method.

Pursuant to another aspect, there is provided a millimeter wave filter assembled from two major components of diverse but advantageously differing fabrication precision.

In still another aspect, there is provided a multiple cavity millimeter wave filter in which cavity signal propagation is orthogonal with respect to a filter substrate element.

Other aspects include providing a millimeter wave cavity filter having a multiple layered cavity structure, an improved tunable millimeter wave cavity filter arrangement, and a millimeter wave cavity filter amenable to a plurality of different tuning element arrangements.

Pursuant to another aspect of the present invention, there is provided a method of making a millimeter wave multiple poled coaxial electrical wave filter. The method can include the steps of forming a plurality of adjacently disposed, open ended, radially intersecting, millimeter wave sized coaxial cavities in a body of electrically conductive material, fabricating an undivided array of coaxial cavity-tuning-capacitance cavity end closure elements compatible with the open-ended intersecting coaxial cavities, and merging the open-ended intersecting coaxial cavities and the undivided array of coaxial cavity tuning capacitance cavity end closure elements into a closed cavity ends multiple poled millimeter wave comb filter assembly.

Consequently the present invention can provide a filter having a resonator with a primary propagation mode that is normal to a resonator substrate. There is also provided a filter having micromachined resonators and a hybrid variable reactance element. This structure can provide a potentially low cost approach to trimming the filters and a reduced cost path to realizing electronically tunable filters.

BRIEF DESCRIPTION OF THE DRAWINGS

The accompanying drawings of this specification illustrate several aspects of the present invention and together with the description serve to explain the principles of the invention. In these drawings:

FIG. 9 shows insertion loss and return loss characteristics for a filter according to the present invention including various deposited metals.

FIGS. 10A, 10B and 10C illustrate simulated typical S parameter performance characteristics for a filter according to the present invention.

DETAILED DESCRIPTION

Figure 1:
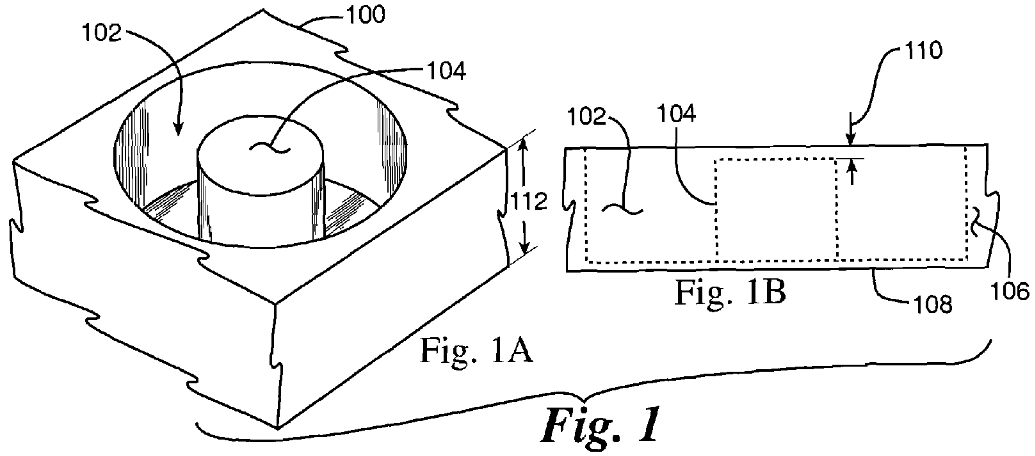
FIG. 1 shows in the views of FIGS. 1A and 1B two views of a portion of a present invention millimeter wave filter cavity.

FIG. 1 illustrates a portion of an air core, coupled, coaxial resonator 100 fabricated with a three-dimensional metal micromachining process of the present invention. This approach contrasts with the known stripline resonator approach. Additionally, by making a cavity resonator normal to a substrate as described herein, it is possible to increase the cross-section of a resonator beyond the limits set by the total layer thickness of the fabrication process. It is also possible to use a circular cross-section for the resonator to achieve lower energy losses. Further, with this approach it is possible to implement filters having an elliptic or pseudo-elliptic response, which are believed to difficult if not impossible to implement in a traditional stripline resonator technology The present fabrication approach includes combining an end loading plate with a coupled coaxial resonator to form a tightly integrated filter. This approach can offer significant advantages over other approaches. For instance, this fabrication approach can simplify device manufacturing by separating the fabrication of the end loading plate from the fabrication of the coaxial resonator. For a fixed frequency filter, this end loading plate can be made simply as a flat metal plate. However, this plate can also be made to provide low cost trimming capabilities in a complete filter. Since trimming is commonly required in narrowband filters, having a low cost mechanism to provide trimming can provide a manufacturing advantage.

Modifying the end loading plate to include microelectromechanical (MEM) variable capacitors is also described and can provide a very low loss approach to achieving high-speed tunable filters. Notably, the loading plate with a coupled coaxial resonator fabrication approach completely separates fabrication of the MEM device from the fabrication of the filter structure to achieve gains in both performance and economy. By using this MEM fabrication for the end loading plate, fabrication of the coupled resonator can be improved, because the final filter structure fabrication is largely an open process. This technique can simplify the final release etch used in the three-dimensional metal micromachining process.

The present invention thus provides a selection filter for radio frequency energy signals in the spectral region known as the millimeter wave band. Signals in this band are generally in the 30 to 300 gigahertz frequency range where the signals have a wavelength of from about 10 millimeters (30 GHz) to 1 millimeter (300 GHz).

While lower frequency filters are known to include resonant cavities, such circuit elements when tailored for use in the millimeter wave band can become impractical. The present invention is therefore believed to provide an answer to a need in the high frequency filtering art that has heretofore remained largely unaddressed.

A millimeter wave single resonator filter can be formed to include a coaxial transmission line fabricated with a three-dimensional metal micromachining process. The transmission line is fabricated with a solid metal core and a surrounding metal ground, as is shown in FIG. 1. This type of line is commonly referred to as an air core coaxial line. In the coaxial line described herein, the transmitted signal propagates in a direction normal to the plane of the substrate used to fabricate the air core coaxial line. This is in contrast to the more standard stripline or microstrip where the signal propagates parallel to the substrate on which the stripline or microstrip is built. The present configuration enables the cross-section of the coaxial line to be defined using a two-dimensional lithographic process, instead of being defined by the cross-section of the layers used to fabricate the line. The cross-section of a transmission line determines important properties of the line, such as impedance and loss.

The FIG. 1 drawing shows, in the views of FIGS. 1A and 1B, two representations of a transmission line millimeter wave filter cavity body. FIG. 1A illustrates a three-dimensional view of a portion of the millimeter wave single resonator filter. A filter portion 100 as shown can be repeated to complete a multiple pole millimeter wave filter to be described herein. In FIG. 1A, a cavity body portion 106 which can include a metallic or metallic covered insulator, includes a circular, air-filled cavity interior region 102. A coaxial central conductor 104 is disposed in a middle portion of the area 102. The central conductor 104 has a lower end portion coupled to the grounded cavity body portion 106 by way of a conductive portion 108 as shown in FIG. 1B.

Another detail of the FIG. 1 cavity visible in FIG. 1B is the shortened length of the central conductor 104 with respect to the cavity length 112. The degree of this shortening appears at gap 110 in FIG. 1B. This shortening relates to a cavity tuning arrangement as is described later herein. When the FIG. 1 cavity is embodied for filter use in the millimeter wave region of the radio frequency spectrum, the central conductor 104 may have a diameter of about 0.1-0.4 millimeters, a <¼ wavelength depth 112 of about 0.5 millimeters and a shortened coaxial length 110 of about 0.025 millimeters. The diameter of the cavity interior region 102 is about 0.8-1.0 millimeters.

The use of a three-dimensional metal micromachining process used for the cavity body in the present invention enables the cavity closed end to be located at either the top or bottom of the transmission line, and if desired, both ends can be shorted in the described manner. From an electrical circuit viewpoint, a shorting metal connection creates a closed circuit between the signal line and the ground. However, if one end is not shorted, a line with one end open and one end shorted is achieved, i.e., an equivalent to a coaxial transmission line that has been shorted at one end to form a transmission line stub has then been accomplished.

Thus, in order to use the FIG. 1 transmission line as a cavity resonator, the remaining open end is closed. In the present invention this is done by coupling an "end cap" onto the end of the resonator, as is represented in the FIG. 2 exterior drawings of a portion of millimeter wave single resonator filter 100. When an end cap 202 is added, a capacitor can be created between the end of the transmission line 104 and the ground to create a resonator. If the capacitor had a value of zero (which is not physically realizable), the resonator would have a resonant frequency, $f_o$, such that the physical length of the line, 1, was one-quarter of the wavelength of a wave at the resonant frequency ($1=\lambda_0/4$). Increasing the capacitance decreases $f_0$ so that the line will have an apparent of length less than one quarter of the resonant frequency ($1=\lambda_0/4$). Incorporating a MEM variable capacitor onto the end cap to be described later thus enables the value of the capacitance to be varied so that the resonant frequency of the cavity can be electronically controlled.

Figure 3:
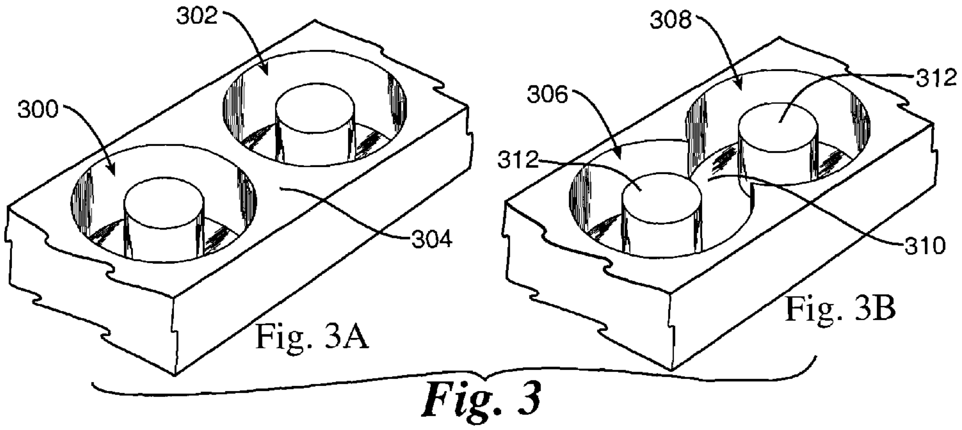
FIG. 3 shows in the views of FIGS. 3A and 3B two embodiments of a two pole present invention millimeter wave filter.

FIG. 3 in the drawings thus shows in the views of FIGS. 3A and 3B two representations of cavities for two-poles of a millimeter wave filter. In the FIG. 3A drawing, the two cavities 300 and 302 are disposed in separated condition, as is appropriate for use in two single pole filters of slightly different frequency or other broadband filtering uses. Notably the cavity intermediate region 304 in FIG. 3A is of an integral nature and provides no radio frequency energy coupling path between the cavities 300 and 302. The cavities 306 and 308 appearing in FIG. 3B are, however, moved closer together than the FIG. 3A cavities, and overlap. Consequently, radio frequency energy coupling between cavities is provided as is appropriate for a multiple poled filter. This coupling occurs by way of a shared tangential region 310 wherein the cavity perimeters meet and provide a common aperture of selected size and dimensions. Each of the FIG. 3 cavities is, of course, provided with a central coaxial element 312 having the described shortened length and grounded distal region. As will become apparent in later figures herein, a multiple sequence of the FIG. 3B two-pole filters is considered to provide selected filter characteristics. Note that since the cross-section of the cavities in FIG. 3 is lithographically defined, the coupling of two closely spaced cavities is also lithographically defined. By controlling cavity resonant frequencies and coupling of adjacent cavities, a range of filters is possible.

Practical filters can be implemented using transmission line resonators with lines ranging in length from $\lambda_0/4$ length down to lengths around $\lambda_0/20$. The metal micromachining processes currently available can produce lines from 0.25 to 1.00 millimeter in length. Based on these values, filters covering frequencies from 15 GHz ($\lambda_0$=20.0 millimeters) to 300 GHz ($\lambda_0$=1.0 millimeter) can reasonably be produced using this approach. When the lines are arranged into a filter, varying the end loading capacitance can be used to either trim the filter for optimal performance, or tune the center frequency of the filter.

The present invention includes the implementation and fabrication approach for these filters. The fabrication approach described in this document is applicable to the implementation of fixed and tunable frequency resonators, fixed and tunable frequency filters, and fixed and tunable diplexers. The present invention filter fabrication process can also be used to fabricate passive microwave and millimeter wave components such as transmission lines, couplers, and routing networks. In addition, active devices can be easily integrated using techniques such as flip chip bonding. One advantage achieved with such filters is that an entire system can be fabricated in a single sequence of operations.

The present filter fabrication process can include three steps: (1) fabricate the coupled resonator cavity structure using a three-dimensional metal micromachining process; (2) fabricate the end cap structure which can be made by microelectromechanical techniques; and (3) bond the coupled resonator structure and the ground structure together to form a filter or diplexer.

Cavity Fabrication

Present invention filters can be made by independently fabricating a coupled resonator component and an end cap component and then coupling, which can include bonding, each together to form the filter. Fabrication of the coupled resonator cavities includes a process that can precisely reproduce the desired two-dimensional configuration of the coupled resonator structure while providing sufficient height, i.e., transmission line length, to realize resonators of the desired frequency characteristic. Processes to achieve this fabrication include the use of a three-dimensional metal micromachining process such as the EFAB® process offered commercially by Microfabrica, Inc. of Van Nuys, Calif. and the Polystrata® process of Nuvotronics, LLC. of Blacksburg, Va.

The Cavity EFAB® Process

Figures 4A, 4B:
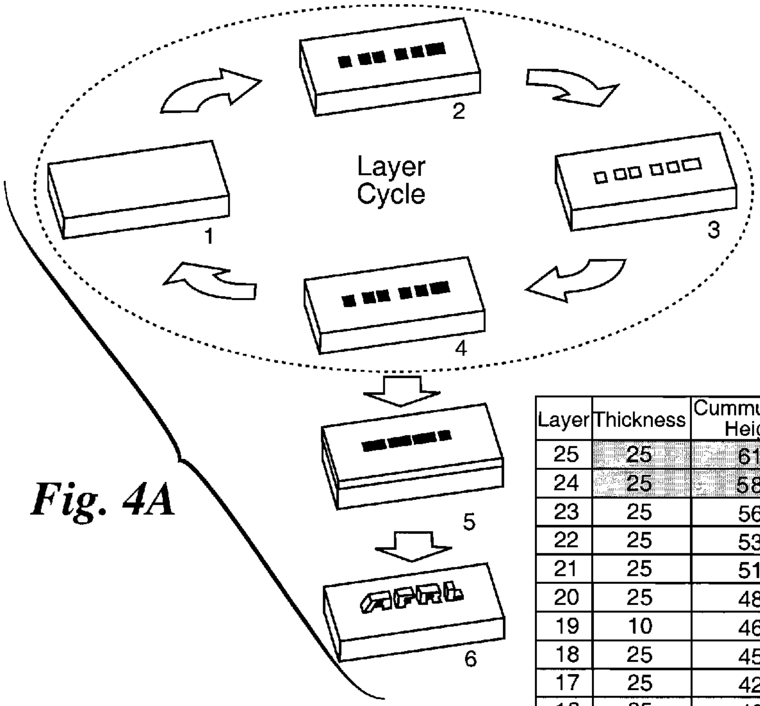
FIG. 4 includes the views of FIGS. 4A and 4B and shows a cavity micromachining cycle for a millimeter wave filter of the present invention and a table of included layer characteristics for the cavity.

The EFAB® process is available from Microfabrica, Inc., and process details are available from the company's website. A set of design rules can be found in the EFAB® Technology Design Guide, version 3.2. The basic process flow for EFAB® processing is shown in FIG. 4 herein and consists of two parts: a layer cycle and a sacrificial release etch. The layer cycle is formed by following the steps (step numbers are illustrated in FIG. 4) as follows: (1) the layer cycle begins with a flat substrate suitable for electroplating; (2) a photolithographically defined mold is used to electroplate a patterned structure, and after plating the mold is removed, leaving a patterned metal structure; (3) a blanket plating is done over the entire surface; and (4) chemical mechanical polishing is done to define the layer thickness. Note that at the end of this step, the surface is now flat and ready for further plating, so the wafer can then move back to step 1 if more layers need to be added, or on to step 5 if all of the layers have been completed.

This layer cycle is performed once for each desired process layer. Typically between 12 and 25 layers may be used, with 25 layers of the indicated thickness being shown in the table included in FIG. 4. Each of the FIG. 4 layers is 25 micrometers thick, except for layer 19, which is 10 micrometers thick. The total height of one cavity is about 610 micrometers. Layers 1-6, 24 and 25 all have unique two-dimensional layouts, while layers 7-23 all have the same two-dimensional layout. Each unique layer requires only one mask, while a repeated layer requires two masks. As a result, 10 masks are required. After all of the layers have been completed, the wafer is as shown in step 5. The cavity device is then selectively etched to remove one of the two metals, leaving behind only the structural metal as shown in step 6.

Cavity End Cap

The fabrication of the end cap may be accomplished in different ways. For a fixed frequency filter, the cap can be as simple as using a flat piece of metal. However, using a known microelectromechanical system (MEMS) process enables the fabrication of variable capacitors which when coupled to the resonator cavity structure enables the center frequency of the resonators and the filter to be tuned. One microelectromechanical process for fabricating the end cap can be found in the "PolyMUMPS Design Handbook, Rev. 11.0" available from MEMSCAP, Inc., Research Triangle Park, N.C.

Figure 5:
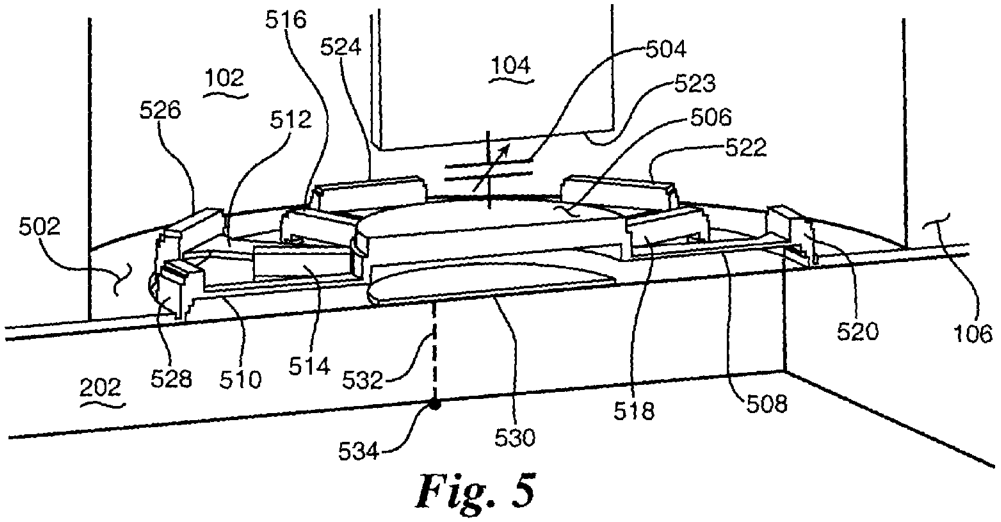
FIG. 5 shows details of a present invention filter tuning electrically variable capacitor element.

Microelectromechanical systems variable capacitors can be realized using a variety of techniques, and several of the known approaches are suitable for present invention filters. Indeed, different types of capacitors have been considered for the filters in this work. One presently useful approach includes moving an electrically connected suspended plate back and forth adjacent to the end of each resonator to increase or decrease the physical separation therebetween and thus the realized plate-to-central conductor capacitance. This is illustrated in FIG. 5 to be described herein. In the case of a single plate, the physical structure is reasonably robust and there is a large area available for an actuation electrode under the plate. Further, the plate and supporting mechanism provide a direct ohmic connection over the entire end capacitor region. This metal "mesh" serves as a Faraday cage substantially preventing radiation from escaping the filter structure. Even a tiny amount of such radiation will dramatically decrease resonator quality factor and thus increase the filter's losses. However, this approach does require a single large MEMS device. The performance and physical position can be affected by temperature variations.

Present invention filter end cap fabrication can begin on a flat substrate. The substrate materials can be silicon, glass, fused silica, sapphire, or a variety of other materials known in the art. In general, glass or fused silica materials are preferred due to their low cost, wide availability, low microwave losses, and low permittivity. One desired process includes four layers and requires five photolithographic masks. Fabrication commences with the deposition of a thin metal layer (0.3 micrometers) to form bias lines, drive electrodes, and landing electrodes. Next, a resistor layer is added, but is not required. For instance, the present invention capacitors do not use this layer. The resistor layer is followed by a sacrificial layer of polydimethylglutarimide (PMGI). Sacrificial layers of 2-5 micrometers thickness can be used for different devices. A dimple is then etched into the sacrificial layer to a depth of 1 micrometer. A 5-micrometer thick gold layer is deposited and patterned to provide low metal losses and form the mechanical structures. Finally, a wet sacrificial release is performed to free the mechanical devices.

Figure 2:
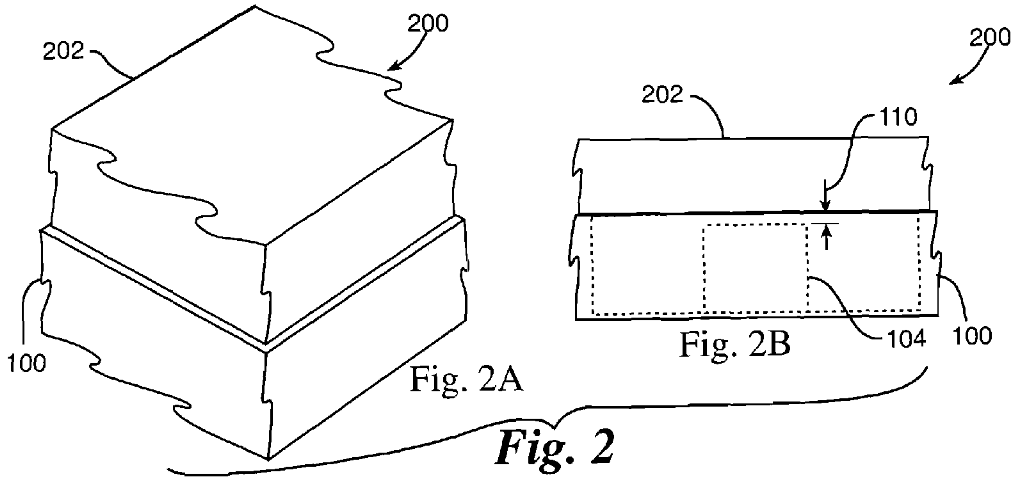
FIG. 2 shows in the views of FIGS. 2A and 2B two views of a present invention millimeter wave filter cavity.

In FIG. 2, the views of FIGS. 2A and 2B illustrate two more complete views of the millimeter wave filter 200, to show that the open cavities of FIG. 1 and FIG. 3 can be closed by an added end cap element 202. The overall relationship between the cap element 202 and the FIG. 2 cavity 204 is shown in cross-section in the FIG. 2B drawing. Of particular interest in this closed cavity condition is the shortened central coaxial element 104 and the separation between the upper end of this element and the closing cap as appears at 110, i.e., the location of the frequency tuning capacitance for the cavity. Gold can be used as the metal defining the interior surface of the cavities as well as the exterior surface of the central coaxial element 104. The surface of the end cap 202 disposed adjacently to the central coaxial element 104 can also include an exposed gold metal surface. Under these conditions, it is possible to achieve a good low electrical resistance connection between the cavity gold and the end cap gold by use of either a metal-to-metal soldering process or by way of a thermal compression bonding process employing heat and pressure. Other processes may be used with other fabrication materials with certain known in the art limitations (e.g., soldering difficulty if aluminum metals are selected).

FIG. 5 illustrates a cross-sectional view of details of a filter tuning electrically variable end cap capacitor element usable in the space 110 of FIG. 2B to alter the resonant frequency of the achieved filter cavity. This view is shown to have the previously illustrated cavity 100 now located on the top. In FIG. 5, there appears (to a larger scale) the cavity wall 106, the shortened cavity central coaxial element 104, the cavity end cap element 202 and an electrical symbol representation of the achieved variable cavity tuning capacitance 504. The actual physical realization of this capacitance 504 is embodied in the form of a grounded movable capacitance plate element 522 cooperating with the end surface 523 of the cavity coaxial central element 104. Control of movement of the capacitance plate element 506 is achieved by way of an electrode 530 mounted in a fixed position on the glass or other electrically insulating end cap substrate element 202. The movable plate element 506 is suspended in space between the control electrode 530 and the end surface 523 by a plurality of flexible cantilever arms 508, 510, 512, etc., which also serve as a grounding electrical connection for the capacitance plate element 506. The control electrode can be used to electronically control the spacing between the surface of the movable plate 506 and the end surface 523. A connector 534 can be coupled to a conductor 532 which is coupled to the electrode 530 for electronic control as would be understood by one skilled in the art.

A plurality of upstanding annular pillars 520, 522, 524, 526 and 528 by which the cantilever arms 508, 510, 512, etc. connect to a grounded metallic layer 502 covering the substrate 202. An additional group of plate element guides 514, 516 and 518 are shown in FIG. 5. These guides are connected the center plate 506 at their innermost ends and are attached suspended a short distance (where this distance is approximately ¼ of the gap between the top of the drive plate 530 and the bottom of the suspended plate 506) above the substrate 202 at their outermost radial end points. These guides serve to provide additional stiffness to the plate after it has deflected a specified amount. This enables the motion of the electrostatic plate to be controlled over a greater range, increasing the tuning range of the filter. Additional details relating to the FIG. 5 variable capacitance element and alternate arrangements of this element are disclosed in my previously issued U.S. Pat. No. 7,283,347, which is hereby incorporated by reference herein. In addition, alternate suspended plate designs including, but not limited to, a fully supported membrane can be utilized.

End Cap Coupling

Bonding the end cap to the resonator structure can be accomplished by a variety of techniques. Direct thermal compression bonding and gold-eutectic soldering can be used. Direct thermal compression of gold-gold can be accomplished with two clean surfaces at temperatures around 300-350° C. This approach can be performed with standard pick and place equipment and generates a very low loss electrical connection between the two gold layers. Gold-germanium eutectic solder can also be considered. This requires depositing gold-germanium onto either the filter die or the end cap. The gold-germanium eutectic melts at temperatures below 300° C., so that a low loss bond can be achieved. The solder approach generally results in more uniform adhesion than the direct compression approach, when the surfaces are not perfectly smooth. Minimal electrical resistance is desired in the gold to gold connection in order to avoid radio frequency energy loss and degraded filter characteristics.

Figure 6:
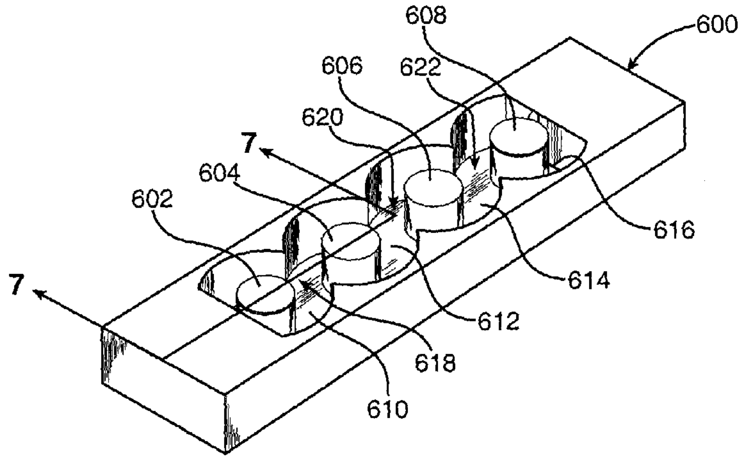
FIG. 6 is a perspective view of a multiple pole millimeter wave filter body.

FIG. 6 illustrates a perspective elevational view of a preferred embodiment of filter body 600 including a first, second, third, and fourth resonators 602, 604, 606, and 608. Each of the resonators is constructed as previously described and each includes a respective cavity 610, 612, 614, and 616. Adjacent cavities 610 and 612 include a shared tangential region 618. Other adjacent cavities 612 and 614 and 614 and 616 respectively include shared tangential regions 620 and 622. It is within the scope of the present invention to instead include intermediate regions between each of the adjacent resonators such as described for FIG. 3. It is also possible to have some regions between adjacent resonators to include intermediate regions and other regions between adjacent resonators to include tangential regions in a single filter body.

Figure 7:
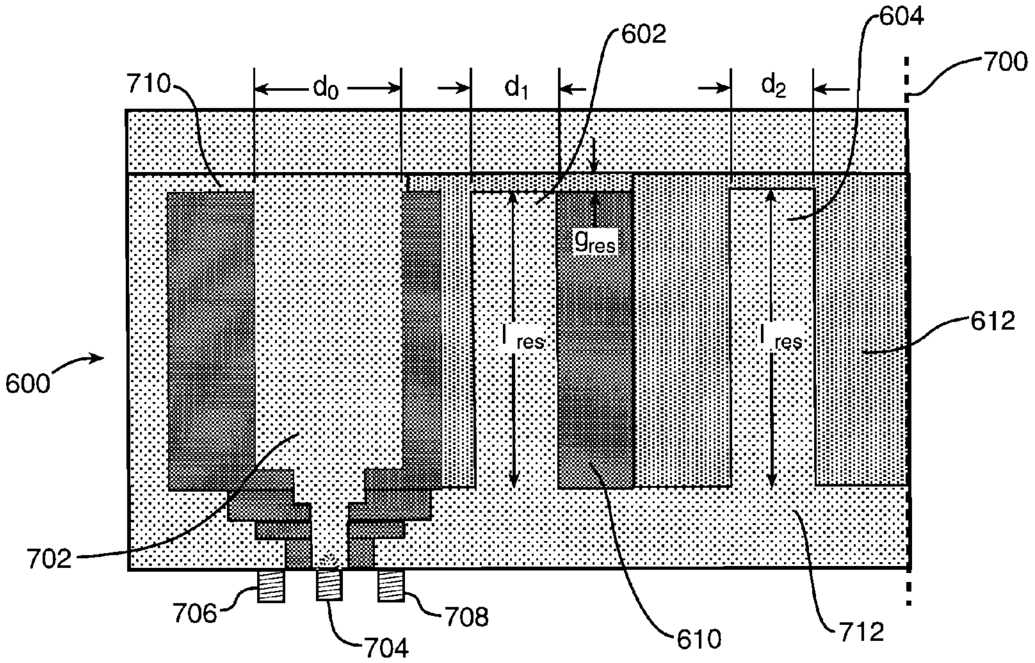
FIG. 7 is a sectional elevational view of the filter body of FIG. 6 along a line 7-7.

FIG. 7 is a sectional elevational view of the filter body of FIG. 6 along a line 7-7. Resonators 602 and 604 are shown and the dashed line 700 illustrates a line of symmetry about which the remaining resonators 606 and 608 are positioned but not illustrated. Cavities 610 and 612 are shown. FIG. 7 also illustrates an input/output matching conductor 702 which is formed as part of the filter body 600 but which cannot be seen in FIG. 6. The conductor 702 includes coupled thereto a probe pad or landing 704 while the filter body adjacent the probe pad 704 includes landings 706 and 708.

All of the resonators of FIG. 6 include the same length, $l_{res}$, and gap, $g_{res}$. The center to center spacing which are not shown are $l_{01}$, $l_{12}$, and $l_{23}$, where the numbers 1 and 2 denote the first and second resonators 602 and 604 respectively and the 0(zero) denotes the input/output matching conductor 702. In addition, the outer conductor 702 is located at a radius $rg_i$, for each of the resonators. (Note that the z-axis has been exaggerated.)

Figure 8:
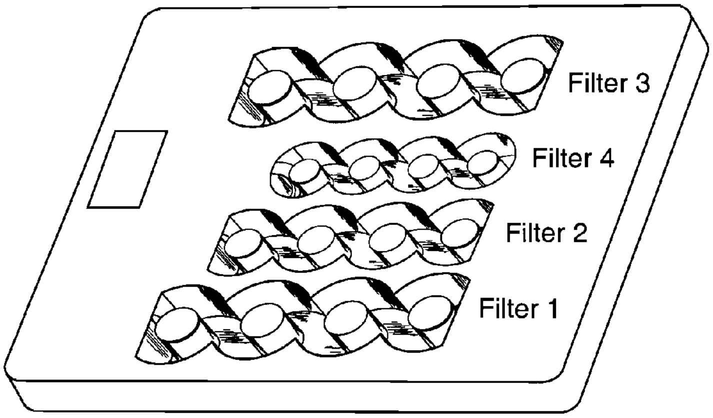
FIG. 8 is a filter body assembly having four independent filter bodies.

The following Table 1 shows the filter design dimensions for the recited dimensions of FIG. 7 and of FIG. 8 where a sampling of various filters are shown.

TABLE 1

(all dimensions in μm (micrometers))

| Filter | $d_0$ | $d_1$ | $d_2$ | $rg_0$ | $rg_1$ | $rg_2$ | $lo_{01}$ | $lo_{12}$ | $lo_{23}$ |
|---|---|---|---|---|---|---|---|---|---|
| 1 | 400 | 254 | 278 | 957 | 865 | 898 | 462 | 721 | 763 |
| 2 | 349 | 218 | 231 | 817 | 729 | 1348 | 415 | 610 | 644 |
| 3 | 413 | 240 | 250 | 929 | 783 | 838 | 560 | 761 | 800 |
| 4 | 353 | 204 | 210 | 791 | 662 | 702 | 501 | 647 | 678 |

As illustrated in FIG. 8, all four designs are based on a four pole (no zero), 0.2 dB equal ripple prototype. To facilitate probing, input/output matching is achieved using a shorted length of transmission line coupled to the outer resonators. This approach results in the probe port 702 and the opposite probe port located at the opposite end of the filter body (not shown) being physically located on an surface 712 opposite a surface 710 to which the resonator loading capacitors are located. For each of the illustrated resonators of the FIG. 8 filter bodies, the resonators are about 460 μm long with the end coupling gap, $g_{res}$ of about 25 μm.

In FIG. 8, full and sub-band filters are shown to illustrate the applicability of the present invention to filters of differing bands. For instance, the following filter designs are illustrated in FIG. 8: Filter 1—full-band 71-76 GHz; Filter 2—full-band 81-86 GHz; Filter 3—narrowband 73-74 GHz; and Filter 4—narrowband 83-84 GHz.

FIG. 9 shows a simulated insertion loss and return loss "S-parameter" characteristics achieved for the filter 2, 81 gigahertz to 86 gigahertz filter, according to the present invention. While these characteristics include a small symmetrical ripple believed attributable to mismatch between the first resonant cavity and the input transmission line of the filter, such a ripple can be corrected with further iterations of filter details.

FIGS. 10A, B, and C show several simulated characteristics of a filter according to the present invention including four variations of the metallization applied to the filter cavities. In FIG. 10A, the frequency versus S11 and S21 characteristics of a 70 gigahertz filter appear in a wide frequency band display, while in FIG. 10B these same characteristics appear in a narrowband form wherein the effect of four different cavity metallizations, nickel, gold, copper and an idealized perfect conductor appear. Silver may also be used for this metallization with a result intermediate that of copper and gold. FIG. 10C shows the S11 characteristic plotted in Smith chart form. The four different metallizations in FIG. 10 represent different resonator quality factor achievements with results between the nickel and gold curves being most practical.

Figure 11:
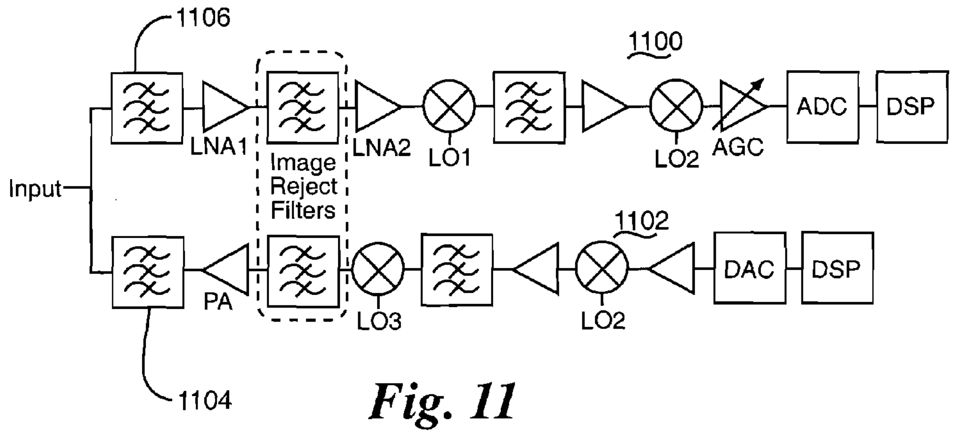
FIG. 11 shows a block diagram for a wireless communication system using a present invention filter.

FIG. 11 shows a block diagram for the manner in which a filter according to the present invention can be used to advantage in a wireless communication circuit. In FIG. 11, the receiver channel of the telephone is identified at 1100 and the transmitting channel at 1102. Since these two channels are active simultaneously, and since they operate at separate but not widely separated radio frequencies from a common antenna, some arrangement for separating the signals of the two frequencies is needed. This separation can be provided as shown at 1104 and 1106 by two filters made in accordance with the present invention. The filters at 1104 and 1106 may be of the type shown in FIG. 10 and may be referred to as providing a frequency multiplexing arrangement.

Figures 12, 12A, 12B, 12C, 12D, 12E:
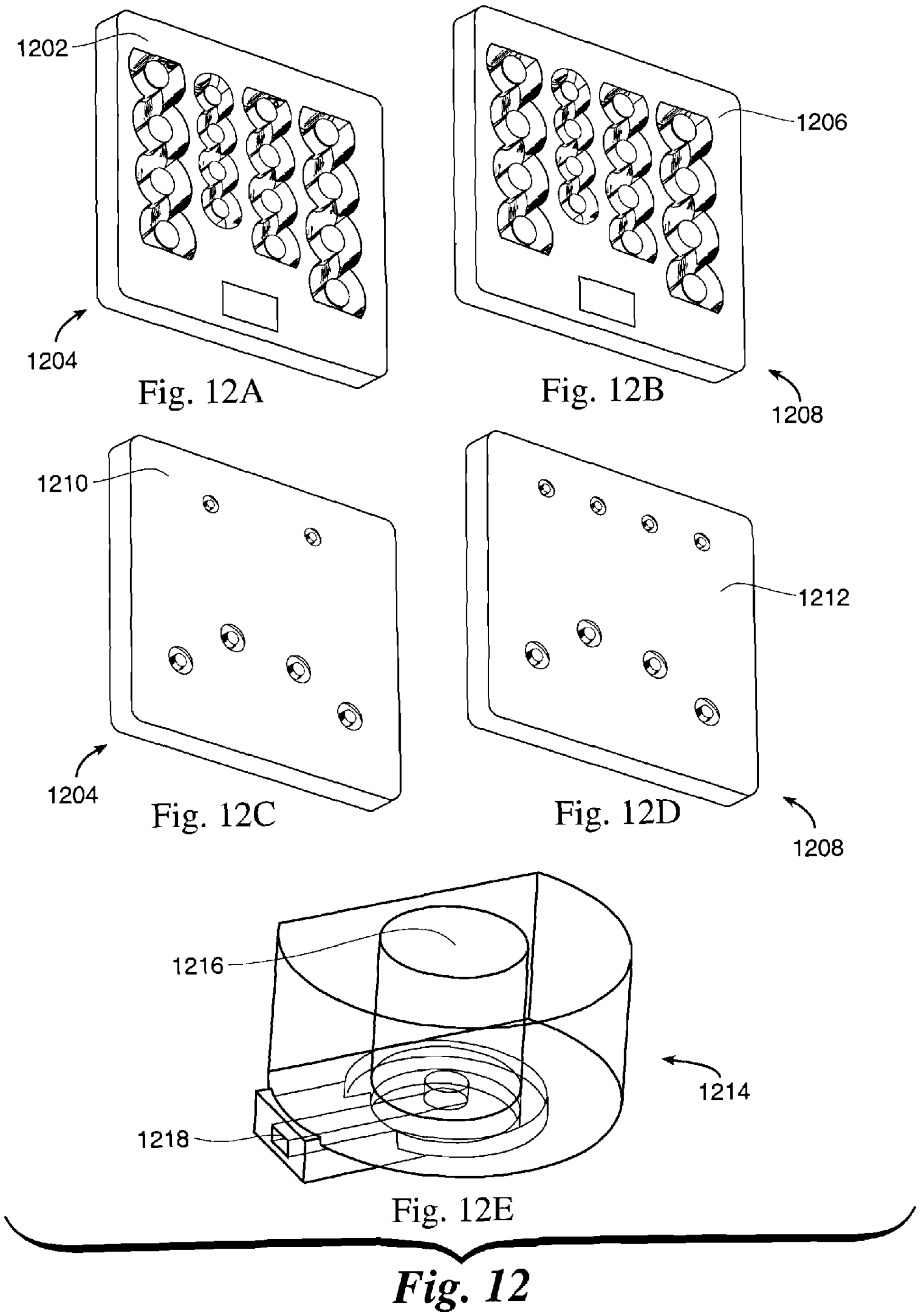
FIGS. 12A and 12B illustrate the cavity assemblies of a present invention and four independent filter die and a diplexer filter die.

FIG. 12A, B, C, D, and E illustrate the top and bottom sides of a diplexer die, filter die, and a modified port for the diplexer. In FIG. 12A, a top side 1202 showing the cavities of a nickel substrate of a two diplexer die 1204 is illustrated in a pre-closure condition. In FIG. 12B, a top side 1206 shows the cavities of a nickel substrate of a filter die 1208 having four individual filters each in a pre-closure condition, similar to that illustrated in FIG. 8. The FIG. 12B filters are placed on the die so they have the same physical positions as on the FIG. 12A diplexer die. Thus, the same ground plane closures with MEMS components can be used with either the FIG. 12A diplexer die or the FIG. 12B filter die.

While the two die appear substantially identical from the top side looking straight down, the reverse sides illustrate a difference between the two die. In FIG. 12C, the back side 1210, of the diplexer die 1208, shows six ports. In contrast, FIG. 12D illustrates a backside 1212 of filter die 1208 having eight ports, each two ports being associated with the conductors of the individual filters. The final FIG. 12 die are each fabricated to be about 4.439 mm×5 mm×0.610 mm in physical size.

Each of the filters on the filter die 1208 of FIG. 12B includes two ports as illustrated which function as input/output ports. In FIG. 12C, each of the diplexers, made up of two filters coupled together, include three ports, where one of the ports operates as a common port and two of the ports operate as channel ports.

To create a diplexer using two filters as a starting point, one of the two ports on a single filter must be modified to enable connection to a second filter. A modified port 1214 of FIG. 12E has been modified to enable connection of a conductor 1216 to a conductor (not shown) of an adjacent filter through a feed port 1218. This feed port runs parallel to the substrate and is connected to the second conductor of the adjacent filter. It should be noted that the design should take into account that the port should present a 50 ohm load to the filter. The impedance looking into the port is calculated and line length added or removed so that the final port (the single port connecting two filters) is located at a position where the impedance looking into the port is an open circuit at the center of the second pass-band for the diplexer.

A present invention filter has a competitive advantage with respect to other configurations of millimeter wave filters because it achieves low insertion loss (<1.0 dB) while also using a fabrication approach easily integrated with monolithic microwave integrated circuits (MMICs) as well as with other planar technologies used in low-cost microwave systems. The ability to integrate the filter with MMICs offers advantages in terms of reduced interconnection loss and reduced manufacturing costs.

The present invention filter bodies can be made significantly smaller than known traditional waveguides on the order of approximately one-hundred times smaller. The filter body can be manufactured using a three-dimensional metal micro-machining process while at the same time offering higher quality factors (and thus lower insertion loss) than stripline or microstrip filters. For instance, it has been found that full-band filters provide an insertion loss of approximately 1 dB over the entire band, while the measured loss for narrow band filters can be less than 2.5 dB. This translates to unloaded quality factors in excess of 400. Fabricating the filters from two separate pieces not only provides tuning or trimming elements in the completed filter, but also improves fabrication consistency. Because the filter bodies are fabricated so that the cross section of the filter is normal to the substrate, precise control of resonator couplings can be achieved, which is particularly relevant to millimeter wave filters. Likewise, a wide variety of geometries including circular and elliptical resonator posts and folded filter layouts can be achieved. Consequently, a majority if not all passive devices for a millimeter-wave communications system can be monolithically fabricated according to the present invention.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A method of making a millimeter wave transmission line filter, the method comprising the steps of:

forming a plurality of adjacently disposed, open ended, radially intersecting, millimeter wave sized cavities in a body of electrically conductive material, each of the cavities having disposed therein having an upstanding central conductor;

fabricating an array of cavity-tuning capacitive closure elements compatible with the open-ended intersecting cavities; and coupling the open-ended radially intersecting cavities and the array of cavity-tuning capacitive closure elements into a closed multiple poled millimeter wave comb filter assembly.

2. The method of making a millimeter wave transmission line filter of claim 1, further comprising a step of forming with a three-dimensional micromachining process the body of electrically conductive material including a plurality of deposited metallic material layers overlying a substrate element.

3. The method of making a millimeter wave transmission line filter of claim 2, further comprising forming in each of the cavities the upstanding central conductor element with a plurality of layers, the layered upstanding central conductor being formed orthogonally with respect to the substrate element.

4. The method of making a millimeter wave transmission line filter of claim 3, further comprising forming in each the capacitive elements, a cantilever supported movable central capacitor plate spaced a predetermined distance for placement adjacent to an end portion of a respective one of the central conductor elements.

5. The method of making a millimeter wave transmission line filter of claim 4, further comprising forming in each of the capacitive elements, a plurality of circularly disposed cantilever central capacitor plate supports and electrical potential determining elements, each fixed at a capacitor plate opposed end thereof.

6. The method of making a millimeter wave transmission line filter of claim 4, further comprising forming in each the capacitive elements, a fixed position electrically isolated central capacitor plate movement control electrode disposed proximate the central capacitor plate.

7. The method of making a millimeter wave transmission line filter of claim 4, further comprising selecting a physical dimension of each the radial intersections in the adjacently disposed, open-ended, radially intersecting, millimeter wave sized cavities to achieve an electrical coupling between the cavities and an energy reflection electrical characteristic of the electrical wave filter.

8. The method of making a millimeter wave transmission line filter of claim 1, wherein forming the plurality of adjacently disposed, open-ended, radially intersecting, millimeter wave sized cavities includes determining a predetermined filter pole for each cavity.

9. The method of making a millimeter wave transmission line filter of claim 1, further comprising selecting physical dimensions of elements formed during the forming and fabricating steps to accommodate filter passband electrical energy of wavelengths between 1 mm and 20 mm.

10. The method of making a millimeter transmission line filter of claim 1, wherein the coupling step includes permanently attaching the array of cavity tuning capacitive closure elements in registration with a respective end node of one of the central conductor elements.

11. The method of making a millimeter transmission line filter of claim 1, wherein the coupling step includes forming a large area, low electrical resistance, permanent bond, between electrical elements comprising the array of cavity tuning capacitive closure elements and a portion of the body of electrically conductive material adjacent each of the coaxial millimeter wave sized cavities.

12. The method of making a millimeter transmission line filter of claim 1, wherein the step of forming the plurality of adjacently disposed, open-ended, radially intersecting, millimeter wave sized cavities in the body of electrically conductive material includes forming the cavities in response to a first array of micromachining tolerance magnitudes and wherein the step of fabricating the array of cavity tuning capacitive closure elements compatible with the open-ended intersecting cavities include fabrication of a second array having smaller dimensions.

13. The method of making a millimeter wave transmission line filter of claim 1, further comprising a step of fabricating isolated multiple signal paths in the filter, each of the signal paths including multiple pole cavities and being tuned to a differing, frequency duplexing pre-determined, passband radio frequency.

14. The method of making a millimeter wave transmission line filter of claim 1, wherein the step of forming a plurality of adjacently disposed, open-ended, radially intersecting, millimeter wave sized cavities in the body of electrically conductive material includes lithographic micromachining masking, exposing and etching steps.

15. The method of making a millimeter wave transmission line filter of claim 14, wherein the step of fabricating the array of coaxial cavity-tuning-capacitive closure elements includes using a microelectromechanical machining process.

16. A method of making a two component millimeter wave transmission line filter, the method comprising the steps of:

forming with lithographic metallic layers a plurality of adjacently disposed, open-ended, radially intersecting, millimeter wave sized, central conductor inclusive circular cavities, wherein the lithographic layers comprise a body of electrically conductive metallic material wherein the lithographic metallic layers are formed over a substrate member with each the central conductors and a central axis of a surrounding cavity being each perpendicularly disposed with respect to the substrate;

coating the circular cavities with a metallic material of enhanced electrical conductivity;

fabricating, in an additional more precise lithographic sequence, an undivided integral array of electrically movable element inclusive cavity-tuning-capacitive elements having registration compatibility with the plurality of open-ended intersecting coaxial cavities; and coupling the undivided integral array of cavity tuning capacitive closure elements with the open-ended intersecting coaxial cavities in a low electrical resistance bonding sequence to form a closed cavity ends multiple poled millimeter wave comb filter assembly.

17. The method of making a two component millimeter wave transmission line filter of claim 16, further comprising the steps of:

accomplishing a first of the closed cavity ends multiple poled millimeter wave comb filter assemblies in a body of electrically conductive metallic material responsive to a first radio frequency; and achieving a second of the closed cavity ends multiple poled millimeter wave assemblies in a body of electrically conductive metallic material responsive to a second radio frequency wherein the first and second millimeter wave assemblies comprise first and second components of a segregated radio frequencies duplex filter.

18. The method of making a two component millimeter wave transmission line filter of claim 17, wherein the first and second components comprise a single body of the electrically conductive metallic material and the metallic material of enhanced electrical conductivity is at least one of nickel, copper, silver and gold.

* * * * *